United States Patent [19]

Pisecky et al.

[11] Patent Number: 5,100,509
[45] Date of Patent: Mar. 31, 1992

[54] PROCESS AND SPRAY DRYING APPARATUS FOR PRODUCING STABLE PARTICLE AGGLOMERATES

[75] Inventors: Jan Pisecky, Taastrup; Soren P. Hansen, Humlebaek, both of Denmark

[73] Assignee: A/S Niro Atomizer, Soborg, Denmark

[21] Appl. No.: 457,655

[22] Filed: Dec. 27, 1989

[30] Foreign Application Priority Data

Jan. 9, 1989 [DK] Denmark .................. 68/89

[51] Int. Cl.$^5$ ............................... B01D 1/18
[52] U.S. Cl. ............................. 159/4.2; 159/4.08; 159/48.1; 34/9; 34/10; 34/57 R; 426/471
[58] Field of Search .............. 159/4.01, 4.02, 4.07, 159/4.2, 4.08, 48.1, 4.4; 34/9, 10, 57 R; 426/471

[56] References Cited

U.S. PATENT DOCUMENTS

| 3,083,099 | 3/1963 | Swanson et al. | 159/48.1 |
|---|---|---|---|
| 3,126,289 | 3/1964 | Spilman et al. | 159/4.2 |
| 3,142,862 | 8/1964 | Guldman | 159/4.08 |
| 3,477,874 | 11/1969 | Repsdorph et al. | 159/4.2 |
| 3,616,834 | 11/1971 | Hansen et al. | 159/4.2 |
| 3,706,599 | 12/1972 | Woodruff et al. | 159/4.2 |
| 4,490,403 | 12/1984 | Pisecky et al. | 426/471 |

FOREIGN PATENT DOCUMENTS 669809 9/1963 Canada .................. 159/4.08
1228567 11/1966 Fed. Rep. of Germany .

OTHER PUBLICATIONS

Milk Powder Technology, 3rd Edition, Nov. 1983, Vagn Westergaard, pp. 68-69, 90 and 98.
Spray Drying Handbook, 4th Edition 1985, K. Masters, p. 53.

Primary Examiner—Wilbur Bascomb, Jr.
Attorney, Agent, or Firm—Armstrong, Nikaido, Marmelstein, Kubovcik & Murray

[57] ABSTRACT

Agglomeration is improved in a straight-through spray drying process by adjusting the location for introduction of recycled fine particles to the atomization zone. The fine particles are dispersed in a minor portion of the drying air and adjustment of the location for the introduction of the fine particles is made so as to change the average distance from the wheel to the area where the fine particles meet atomized droplets or partly dried particles. A spray drying apparatus in which the fine particles are recycled through the use of turnable deflectors, telescopic connections or swivel joints which are suitable for achieving the improved agglomeration.

9 Claims, 6 Drawing Sheets

PROCESS AND SPRAY DRYING APPARATUS FOR PRODUCING STABLE PARTICLE AGGLOMERATES

FIELD OF THE INVENTION

The present invention deals with a process for spray drying liquids containing dissolved or suspended solids to produce stable particle agglomerates, as well as a spray drying apparatus for use in the process.

Powdery materials produced by spray drying of solutions or suspensions, such as milk powders, are very often required to have so-called instant properties. The term "instant" means readily dispersible or readily soluble in liquids, especially aqueous liquids.

To obtain instant properties of a spray dried powder it is usually essential that it consists of agglomerates of primary particles. For products containing only a minor portion of fat, such as skim milk powders, agglomeration is the only process which is necessary to achieve instant properties in cold water, whereas fat-containing products require an additional treatment, viz. a coating with a component having both lipophilic and hydrophilic properties to cover the water repellant fatty layer normally present on the surface of the particles or agglomerates.

Non-agglomerated spray dried powders consist of single particles which, when milk powders are concerned, usually have a mean size in the range 40–100 microns. Such powders are relatively heavy, inter alia they have high bulk density, are dusty and difficult to reconstitute in water. When such powder is poured into water a heap of powder forms on the water surface, and at the first contact of the water with the heap of powder a particle slurry is formed at the interface which prevents penetration of water to the interior of the heap of powder. Consequently, only a minor part of the powder is dispersed or dissolved resulting in a weak solution or suspension containing lumps wetted only on the surface and containing dry powder inside.

An agglomeration process transforms the single particles into clusters of particles called agglomerates. Agglomerating increases the mean particle size and decreases the bulk density (the term "mean particle size" here denotes mean size of the elements of the powder which can be either single particles or agglomerates). Therefore, agglomerated powders are considerably more voluminous than conventional powders. This is because they have higher content of interstitial air which means the air inside and between the agglomerates. At the reconstitution this high content of interstitial air is replaced by water allowing the agglomerates to disperse and disintegrate to form a solution or suspension without lumps.

Thus, a controlled agglomeration (possibly combined with the above mentioned treatment with lipophilic and hydrophilic agents) is by far the most essential measure to obtain a suitable wettability and dispersibility and other properties of spray dried powders to ensure the desired instant characteristics thereof.

DESCRIPTION OF PRIOR ART

A description of methods hitherto used for agglomerating spray dried powder is presented in the following paper: J. Due Jensen: "Agglomerating, Instantizing and Spray Drying" Food Technology June pg. 60–71 (1975).

The various methods available for agglomeration of spray dried powders may be termed either rewet processes or straight-through processes. Rewet processes are carried out after the powder has been manufactured whereas in the straight-through processes agglomeration takes place during the spray drying, i.e. during and immediately after the primary particles have been formed.

In a typical straight-through process, fine particles, i.e. non-agglomerated particles, produced in the spray drying step, are recycled to meet liquid droplets or moist sticky particles in the atomization zone.

When an atomizer wheel is used for atomizing the liquid to be spray dried, the fine particles are being recycled to a fixed location just above the periphery of said wheel as illustrated in the above mentioned paper or they may be blown upwards against the atomized droplets from a position centrally below the atomizer wheel as also illustrated in said paper.

It has also been suggested (DE-AS 1 228 567, Max E. Schultz) to blow the fine particles by means of moisturing steam and optionally pressurized air in a direction radial to the atomizer wheel to force the fine particles into the cloud of atomized droplets and partly dried particles counter-currently thereto. However, by this method a mixture is formed consisting of agglomerates of very different structure and size.

Therefore prior art processes are not so efficient as desirable as to ensure that a large proportion of the recycled fine particles are incorporated into agglomerates of the desired structure, size and mechanical strength.

SUMMARY OF THE INVENTION

It has now turned out that adjustment of the location for recycling of the fine particles in relation to the atomizer wheel and other parameters as defined below enables obtainment of a larger proportion of agglomerates of desired structure, particle size and strength.

This fact is utilized in the process according to the present invention which deals with a process for spray drying liquids containing dissolved or suspended solids to produce stable particle agglomerates, wherein the liquid is atomized in a drying chamber by means of an atomizer wheel to form droplets; a stream of drying air encircling the atomizer wheel is conducted against the ejected droplets in directions predominantly transversely to the paths of these, whereby the droplets are progressively dried as they move away from the atomizer wheel, to form a particulate material; and the finest fraction of particles of said material is recovered and recycled pneumatically to the drying chamber and made to collide with ejected, and only partly dried, sticky particles, which process according to the invention is characterized in (i) introducing said finest particles into the stream of drying air before it meets the ejected partly dried droplets, and dispersing said particles in a minor portion only of the stream of drying air, (ii) entraining said finest particles in the drying air to pass transverse to the paths of, and to collide with the partly dried droplets at a defined distance from the wheel periphery, and (iii) adjusting the location for the introduction of said finest particles to adjust said defined distance, of the place for collision, from the wheel in the dependency of the characteristics of the liquid to be dried and operational parameters, to obtain agglomerates of desired structure and particle size distribution.

The above mentioned adjusting of the location for the introduction of the finest particles to be recycled may be performed without undue experimentation by a skilled person who considers the explanation below as to the relationship between the distance of the area, where the finest particles are contacted with the droplets or only partly dried sticky particles from the wheel periphery, and the structure of the resulting agglomerates.

1) If the location for the introduction of the finest particles is adjusted to have only a very short distance from the atomizer wheel periphery to the area where the finest particles meet the atomized droplets, only a minor evaporation has taken place from the droplets and they are still predominantly liquid. The fine particles which meet these liquid droplets either penetrate into the interior of these or the surface of the fine particles are coated with the droplets. In this last mentioned case a so called "onion"-structure is formed. Both these cases result in a single particle of increased size which often exhibits some deformation. The two type of structures are shown on FIG. 1 as structure a and b, resp. Both structures have high mechanical stability and low specific bulk volume and are not agglomerates desired in instant powders.

Figure 1:
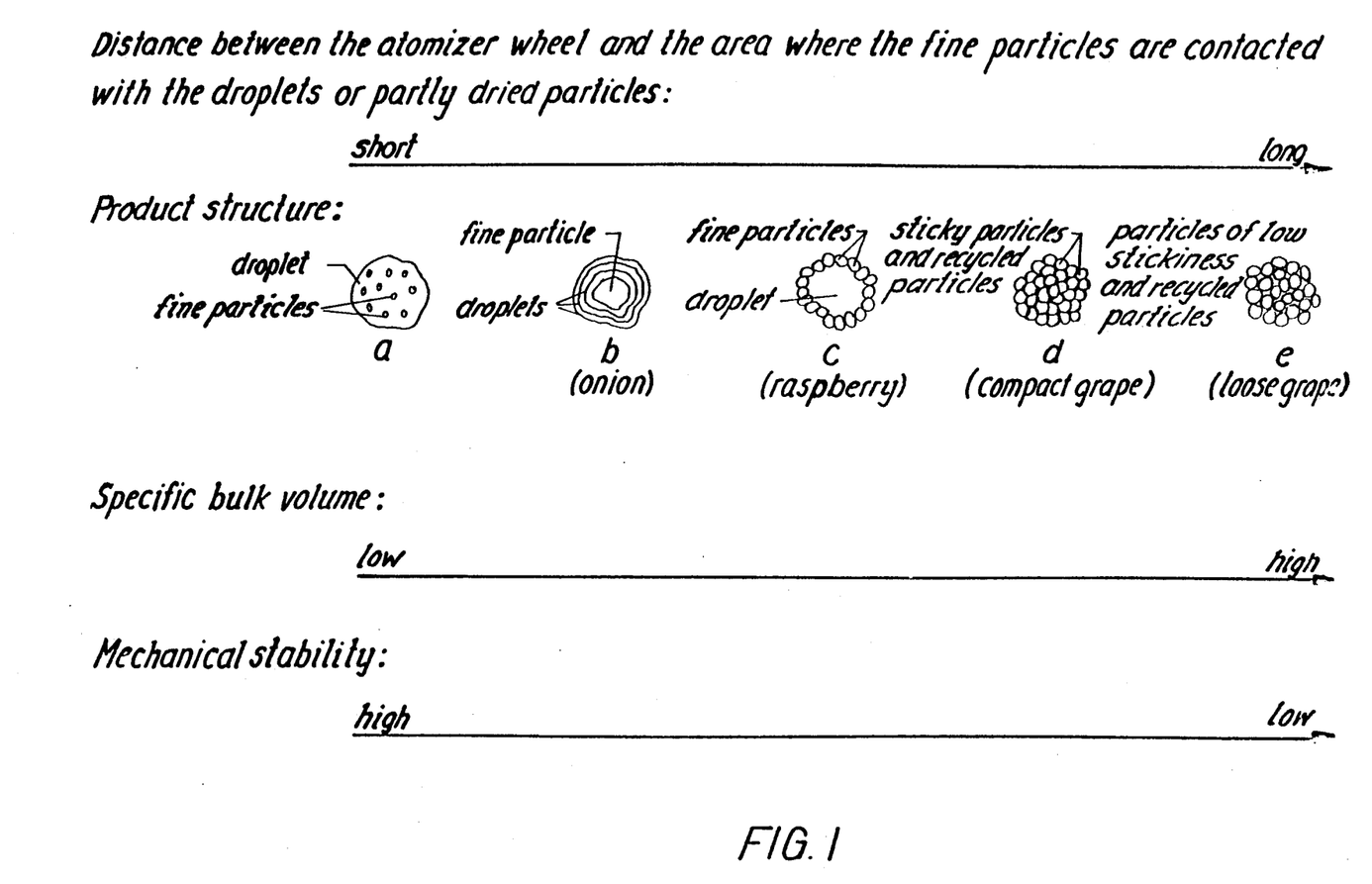

2) If the distance of the area where the collision takes place from the wheel is somewhat longer, evaporation from the droplets has proceeded further but the moisture content will still be sufficient to retain plasticity and the fine particles penetrate partly into the droplet surface producing a pseudo-agglomerate which may be described as a "raspberry"-structure (c on FIG. 1). Obviously, such structure has not much porosity and consequently the specific bulk volume is rather low. Thus structure c is also not ideal, when an instant product is desired.

3) When the distance from the wheel to the above defined collision area is even longer, the atomized droplets have been transformed into solid particles of little plasticity which are still sufficient sticky and true agglomerates with high porosity a "grape"-structure results (structure d in FIG. 1). The resulting powder has high specific bulk volume. The mechanical stability is less than that of the particles of structure a, b or c but sufficient to enable mechanical handling for instance in canning apparatuses.

4) When the collision area is at even longer distance from the wheel the particles created by the drying of the atomized droplets have low moisture content and therefore low stickiness, and the agglomerates created are of a "loose grape-structure". (Structure e on FIG. 1).

When milk powder is dealt with the most desired structure will be a structure of the compact grape type (d).

Thus, it is possible without undue experimentation to adjust the above defined distance to obtain the desired agglomerate structure and to compensate for variations of operational features which would otherwise influence the quality of the product. Examples of such operational features are concentration and temperature of the feed, pre-heat treatment of the feed (when the feed is a milk product), drying air flow, rotational speed of the atomizer wheel, etc.

The invention also comprises a spray drying apparatus for performing the process, comprising a drying chamber having an atomizer wheel therein for injecting droplets of the liquid to be spray dried into the drying chamber, means for providing a stream of drying air around the atomizer wheel and predominantly transversely to the path in which the droplets are ejected from the wheel, a particle separator for recovering the finest spray dried particles from the drying air, and means for recycling these finest particles to the drying chamber, which spray drying apparatus according to the invention is characterized in that said means for recycling the finest particles comprise at least one conduit debouching in the drying chamber at a location which, when the apparatus is in operation, is within the stream of drying air and upstream of the area where said drying air meets the ejected droplets, and the location for the debouching of said at least one conduit is adjustable to enable a variation of the distance between said area where the recycled fine particles entrained in drying air meet the ejected droplets, and the atomizer wheel periphery.

Several mechanical constructions may be utilized to obtain the necessary possibility for adjusting the above defined distance crucial to the characteristics of the resulting agglomerates.

In one of the preferred embodiments of the spray drying apparatus according to the invention the atomizer wheel is mounted on an atomizer housing of conical shape having its smallest diameter adjacent to the wheel and around this housing is a drying air disperser providing a stream of drying air close to the outer wall of said conical housing and in directions parallel thereto, which apparatus according to the invention is characterized in having a pipe for pneumatic introduction of fine particles to be recycled, which pipe passes through said outer wall of the conical housing and which pipe has an aperture into the drying chamber, the rectangular distance of which aperture to the conical outer wall of the housing is adjustable.

A way to enable adjustment of said rectangular distance from said aperture to the conical wall is by telescopic variation of the lengths of that part of said pipe which projects into the drying chamber.

In connection with this last mentioned embodiment it is an advantage to have said aperture placed in the side wall near the terminal end of said pipe and that said pipe has an end portion which due to the telescopic construction may be turned to provide further possibility for amending the rectangular distance between the aperture and the conical housing wall.

In an alternative embodiment of the apparatus according to the invention the desired possibility for adjusting the distance between the wheel and the area where the recycled fine particles meet the ejected droplets and partly dried particles, is obtained by having the location for the debouching of said, at least one conduit adjustable by means of a swivel joint in that part of the conduit which extends into the drying chamber.

This last mentioned embodiment is suitable not only in connection with spray drying apparatuses having a conical atomizer housing but also where said housing has other shapes, for example being cylindrical.

The same applies to a further, and preferred, embodiment in which the pipe for introducing the particles to be recycled at the terminal end thereof is provided with a turnable slide (called deflector), able to divert said particles in a direction at an angle with the centerline of said pipe, which deflector may be turned to pneumatically inject said particles in any direction substantially rectangular to the pipe.

Figure 3:
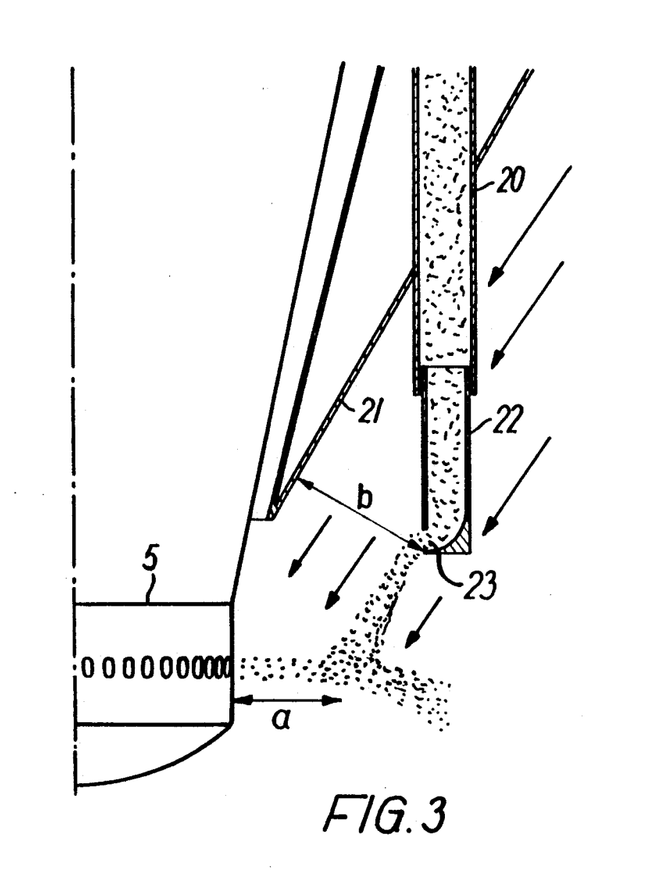

Needless to say that further variations of bulk volume can be achieved when turning the deflectors of a multi-discharge pipe unit in various directions.

By utilizing the present invention to obtain optimal conditions for creation of desired agglomerates, the amount of fine particles which have to be recycled is reduced. Such a reduction is advantageous since any recycling to the heat and moist conditions in the spray drying chamber envolves a risk of heat damage resulting in reduced product qualities, for instance reduced solubility. Thus, the advantage of the present invention is not restricted to the obtainment of agglomerates of desired structure, also other product qualities are improved, especially when heat sensitive materials are produced.

DESCRIPTION OF PREFERRED EMBODIMENTS

The invention is further elucidated with reference to the drawing, where

FIG. 1 schematically illustrates the influence of the distance between the atomizer wheel and the area where the fine particles are contacted with the droplets or partly dried particles on product structure, specific bulk volume and mechanical stability, as previously referred to, FIG. 2 schematically shows an embodiment of a plant for the manufacture of spray dried instant whole milk or other fat containing food powder by the process according to the invention, which plant comprises a spray drying apparatus according to the invention, FIG. 3 schematically depicts an embodiment of a detail of the apparatus shown in FIG. 2 within the rectangle I, FIG. 4 schematically shows an other embodiment of the detail within the rectangle I in FIG. 2, FIG. 5 schematically depicts a further embodiment of the detail within the rectangle I in FIG. 2, FIG. 6 is a graph belonging to the Examples 1-12 below, FIG. 7 is an electron micrograph showing agglomerates obtained in Example 3 below, and FIG. 8 is an electron micrograph showing agglomerates obtained in Example 10 below.

In FIG. 2 a stream of hot drying air is supplied via a duct 1 to a drying air disperser 2 at the ceiling of a spray drying chamber 3.

Concentrated whole milk is via conduit 4 fed to an atomizer wheel 5 from which it is ejected as droplets. By contact with the downward stream of hot drying air provided by the air disperser 2 said droplets are transformed into milk powder. A substantial part of said milk powder leaves the bottom of the drying chamber while still having a higher moisture content than the one desired in the final product.

This powder falls into a vibrated fluidized bed drying apparatus 6 from where it with a reduced moisture content is let to a further vibrated fluidized bed drying apparatus 7 from where it passes on to a lecithintreatment unit 8 to be sprayed with lecithin dissolved in edible oil or fat.

After this lecithin treatment the powder is passed through a further vibrated fluidized bed apparatus 9 to further condition the powder as conventional.

The drying air leaves the spray drying chamber 3 through a duct 10. A substantial amount of fine powder particles are entrained by the drying air passing through duct 10 which are separated from the air in a cyclone 11. The drying air leaves the cyclone through a stack 12.

The three vibrated fluidized bed apparatuses 6, 7 and 9 receive conditioning air, as indicated by 13, 14 and 15, which passes through the fluidized powder layer maintained in each fluidized bed apparatus. Thereby a substantial part of the finest particles in the fluidized layers are blown off and removed from the fluidized layers by the air which leaves the vibrated fluidized bed apparatuses through the conduits 16, 17 and 18, respectively.

The outlet air with entrained fine particles from the three fluidized bed apparatuses is led into a cyclone 19 to recover the fine particles.

The fine particles recovered in the cyclones 11 and 19 are pneumatically recycled to the spray drying chamber 3 via pipe 20.

The essential features of the present invention relates to the debouchment of pipe 20 into the spray drying chamber. Said debouchment is depicted on FIGS. 3 4 and 5.

On FIG. 3, the numbers 5 and 20 have the same significance as on FIG. 2. 21 represents the outer wall of a conical housing surrounding the atomizer, through which wall the end of the pipe 20 passes into the drying chamber.

In the embodiment depicted in FIG. 3 the end of the pipe 20 is provided with a telescopic extension 22, the position of which in the pipe 20 can be adjusted not only vertically but also by turning the extension around its longitudinal axis.

At its bottom end said extension has an aperture 23 in one side whereas the opposite side and the bottom is formed as a deflecting member to enable smooth pneumatic passage of the recycled fine particles out through the aperture 23.

From the drying air disperser 2 shown in FIG. 2, a stream of drying air passes downward along the wall 21 and in directions substantially parallel thereto, as indicated by the arrows in FIGS. 3, 4 and 5.

The direction of this stream of drying air usually also has a certain rotational component which, for the sake of simplicity, is disregarded in the present explanation.

The fine recycled particles which reach the drying chamber through the aperture 23 will disperse in a portion of the stream of drying air, and entrained in the drying air they are carried downward to collide with droplets ejected from the wheel 5 and partly dried particles. On FIGS. 3, 4 and 5 the distance from the wheel periphery to the area where said collision takes place is indicated by a.

By varying the distance a it is possible to adjust the agglomeration as explained above and further illustrated in the Examples below.

As it is obvious from FIG. 3 any change of the rectangular distance b from the aperture 23 to the wall 21 will be reflected in a corresponding change of the distance a.

The distance b (and consequently a) may be decreased by fixing the extension 22 in a higher position in the pipe 20, whereas an increase of the distance b may be achieved by fixing the extension 22 in a lower position and/or by turning the extension to have the aperture 23 directed away from the wheel 5 or to have it in an intermediate position.

In the embodiment of FIG. 4 an extension 24 is connected to the pipe 20 by means of a swivel joint 25 whereas the remaining part of the extension corresponds to extension 22 shown on FIG. 3.

Figure 4:
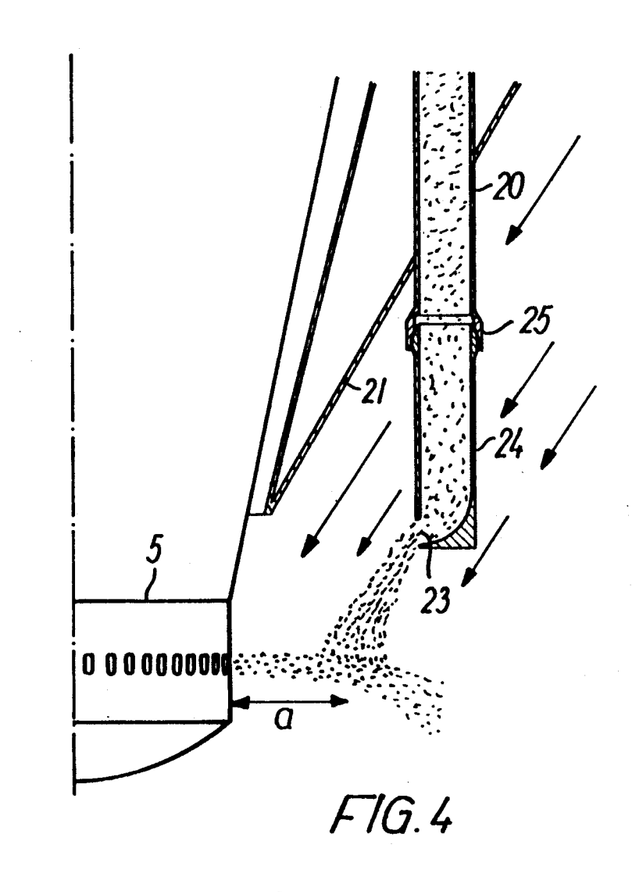

In the embodiment of FIG. 4 the distance a may be adjusted either by bending the extension towards or away from the atomizer wheel or by turning the aperture 23 more or less away from the atomizer wheel or by utilizing both these measures.

The embodiment of FIG. 4 with swivel joint is suitable not only in connection with spray drying apparatuses having conical atomizer housing constructions but also in connection with apparatuses having cylindrical atomizer housing.

Figure 5:
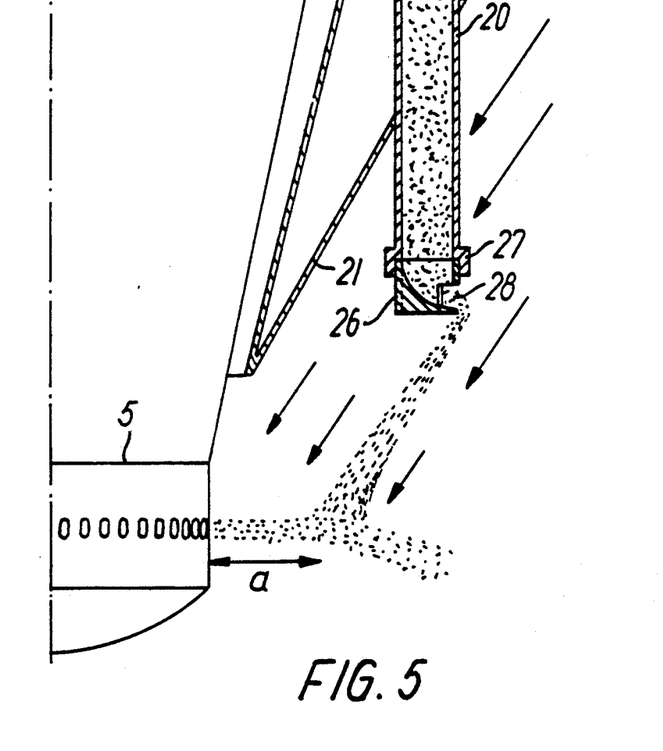

In the embodiment depicted on FIG. 5 the pipe 20 is provided with a deflector 26 releasably and turnably arranged in a bushing 27. The deflector guides the fine particles out into the drying chamber through an aperture 28 the position of which may be altered by turning the deflector. This embodiment enables an adjustment of the distance "a" within limits somewhat narrower than the limits existing for the embodiments in FIGS. 3 and 4 but it will satisfy the requirements of most commercial plants, and the embodiment is preferred due to simplicity and reliability.

In spray dryers with an air flow pattern of a substantially rotary nature, the effect of turnable deflectors on the distance "a" (FIGS. 3, 4 and 5) will be determined by a complicated balance of mass and momentum flows of the rotating drying air and the stream of fine particles and their accompanying transport air. It is obvious, however, that the distance "a" will be longer when the fine particles are injected in a cocurrent direction than when they are injected in a counter-current direction (with regard to the direction of the stream of drying air). The effect on the specific bulk volume of the resulting powder will differ in a similar way.

The spray drying apparatus according to the invention preferably has a plurality of adjustable means for introducing the recycled fines. For simplicity only two such means are indicated on FIG. 2, but four or six or even more such means are regarded as preferred in apparatuses for commercial production.

The invention is further illustrated by means of the following Examples.

EXAMPLES 1-12

Figure 2:
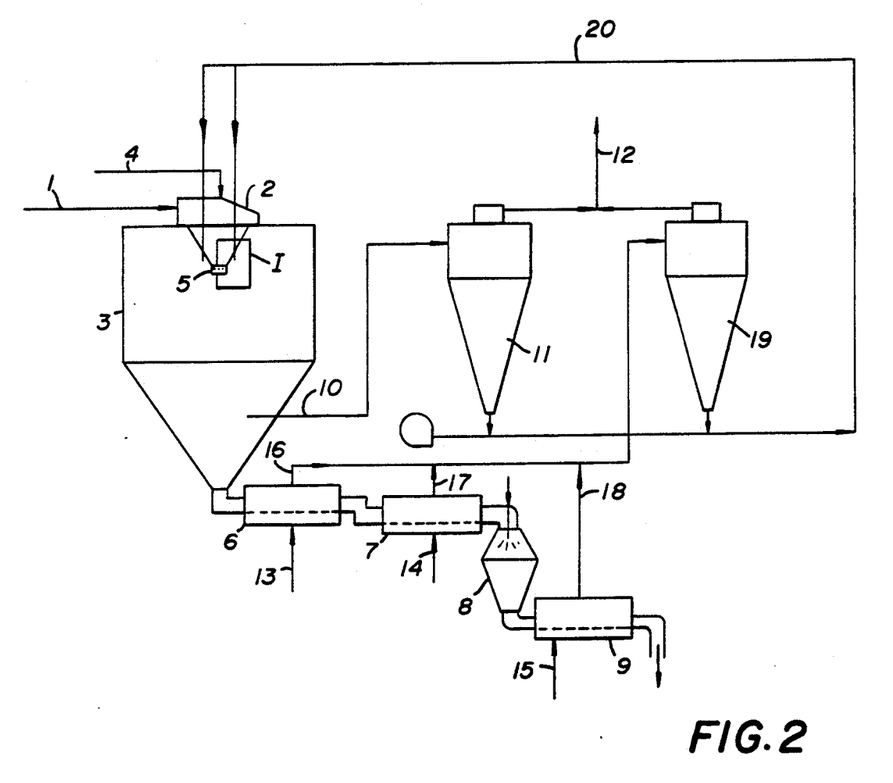

These Examples were performed in a plant as the one illustrated in FIG. 2 utilizing recycling measures as illustrated in FIG. 3. The number of recycling pipes with extensions in the spray drying apparatus was 4.

The purpose of these Examples was to demonstrate the possibility of varying the degree of agglomeration (expressed in terms of specific bulk volume) by adjusting the distance b (and thereby a) in FIG. 3.

The feed to be atomized was concentrated whole milk.

All these twelve Examples were performed using identical operational parameters except that the distance b was different in each Example. The distance b was adjusted from 57 mm to 203 mm by telescopic adjustment of the extension 22 in the pipe 20 and by turning the direction of the aperture 23 more or less towards or away from the atomizer wheel.

The results appear from the following Table.

TABLE

| Example | b, mm | Specific bulk volume ml/100 g | Bulk density kg/m$^3$ |
| --- | --- | --- | --- |
| 1 | 57 | 220 | 455 |
| 2 | 75 | 230 | 435 |
| 3 | 93 | 240 | 417 |
| 4 | 107 | 240 | 417 |
| 5 | 125 | 242 | 413 |
| 6 | 143 | 256 | 391 |
| 7 | 147 | 257 | 389 |
| 8 | 160 | 257 | 389 |
| 9 | 176 | 261 | 383 |
| 10 | 177 | 264 | 379 |
| 11 | 195 | 275 | 364 |
| 12 | 203 | 280 | 357 |

Figure 6:
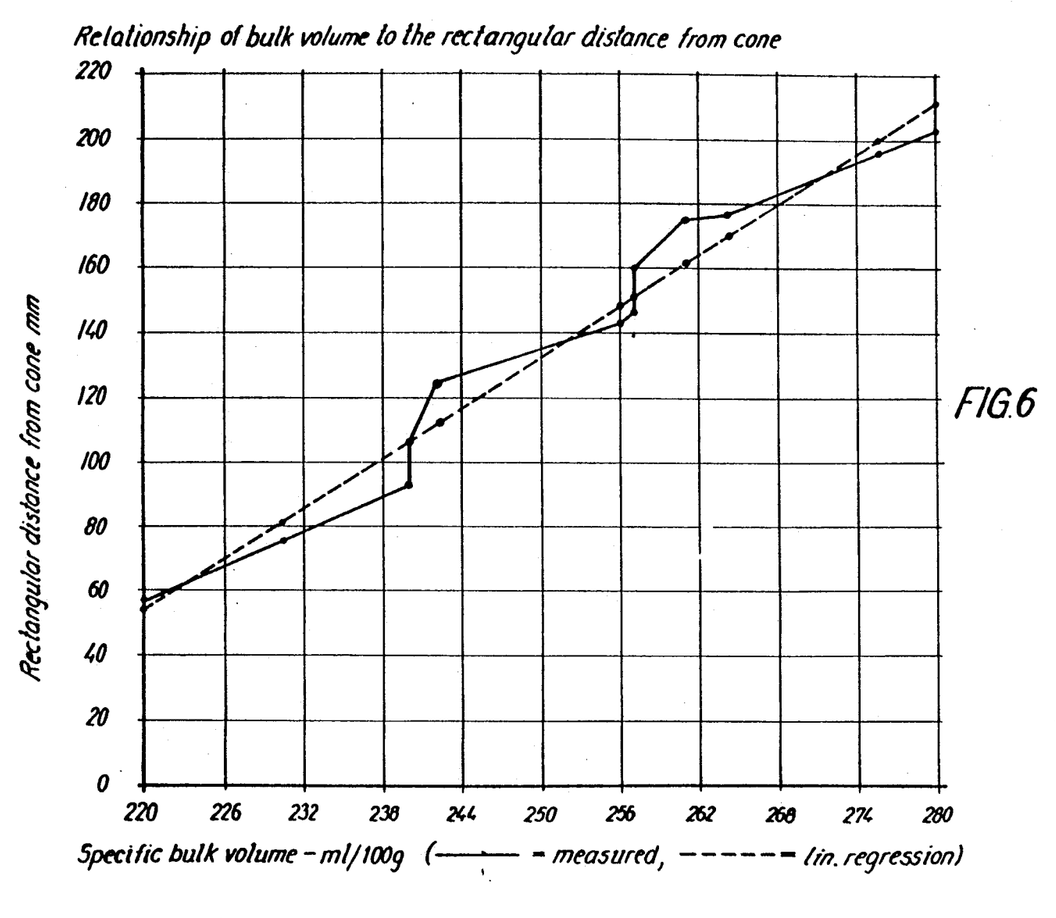

A graph based on the above values is presented in FIG. 6, from which it appears that an approximately linear relationship exists between specific bulk volume and the distance b (and consequently also the distance a), at least within the range covered by the twelve Examples.

Samples of the products from Example 3 and 10 were subjected to electron microscopy.

Figure 7:
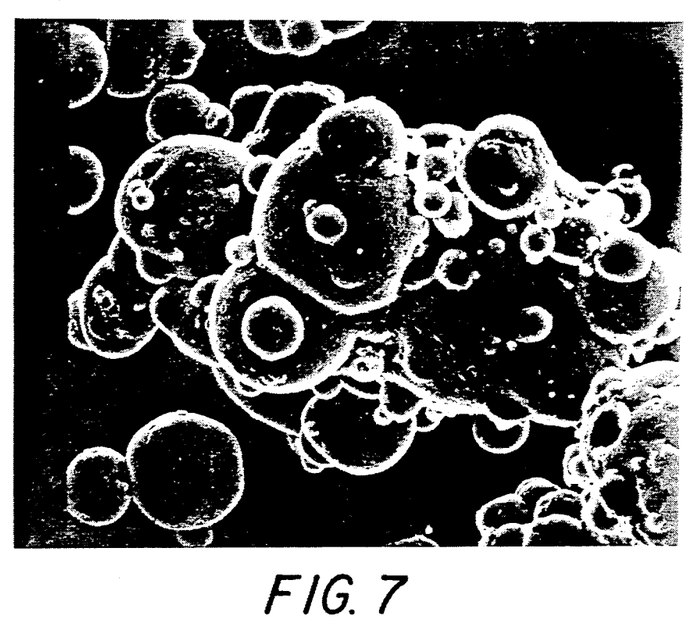

FIG. 7 shows, at a magnification of 400 diameters, agglomerates obtained in Example 3. These agglomerates have the structure which above is described as "compact grape".

Figure 8:
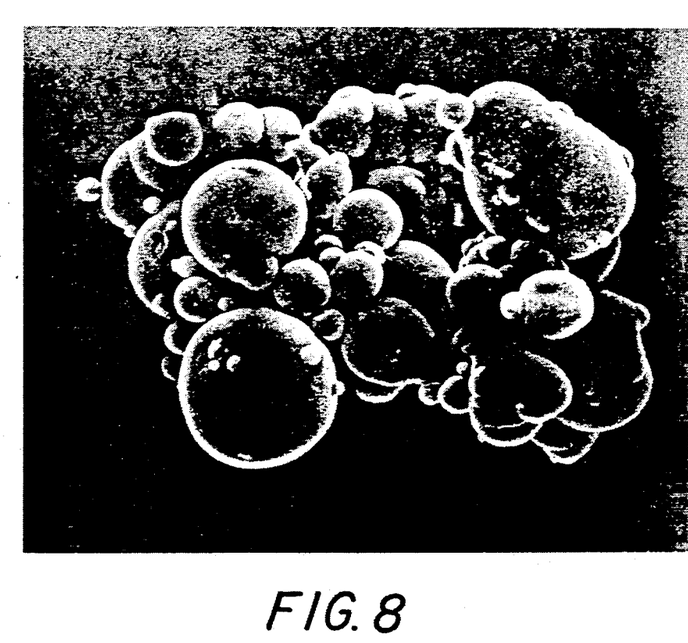

FIG. 8 shows at a magnification of 500 diameters material obtained in Example 10. As expected the structure here is substantially less compact than the one obtained in Example 3. The amount of interstitial air between the primary particles is higher and the areas of contact between the primary particles are smaller, and the agglomerate shown is of the type above termed "loose grape".

EXAMPLE 13

Also this Example was performed in a plant as the one illustrated in FIG. 2 in which the spray drying apparatus had four fine particle recycling means constructed as shown in FIG. 3.

The spray drying chamber had a diameter of 9.9 m and a cylindrical height of 9.6 m. The top angle of the conical bottom part of the chamber was 60°.

9800 kg whole milk concentrate with 48% total solids and 28% fat in solids and at a temperature of 70° C. was atomized per hour.

The temperature of the main drying air provided through duct 1 to the chamber was 180° C. The outlet temperature was adjusted to give approximately 6% moisture in the powder recovered from the bottom of the drying chamber.

The final drying of the powder took place in the three vibrated fluidized bed apparatuses 6, 7 and 9 which were supplied with air at the following temperatures: At 13 95° C., at 14 75° C. and at 15 40° C.

A lecithin solution consisting of powdered lecithin in an amount of 0,2% lecithin calculated on powder, dissolved in butter oil (40% lecithin) was sprayed onto the powder in the unit 8. The fine particles entrained in the various gas streams were recovered in the cyclones 11 and 19 and recycled through the pipe 20 and the extensions 22. The rectangular distances b to the conical wall 21 (FIG. 3) were 203 mm (applies to each of the four extensions).

The amount of fine powder recycled per hour through 20 corresponded to 16-21% of the product recovered from 9, which is a relative small proportion.

The instant whole milk powder obtained had the following characteristics:

|  | Specific bulk volume | Bulk density |
|---|---|---|
| Tapped 0 x: | 286 mg/100 g | 350 kg/m$^3$ |
| Tapped 100 x: | 240 ml/100 g | 417 kg/m$^3$ |
| Tappet 1250 x: | 227 ml/100 g | 440 kg/m$^3$ |
| Solubility index: | <0.1 (ADMI) | |
| Wettability: | 6 sec. (IDF method 87:1979) | |
| Particle size distribution | | |
| >500 microns | 5% | |
| 355–500 microns | 10% | |
| 250–355 microns | 19% | |
| 212–250 microns | 12% | |
| 180–212 microns | 15% | |
| 150–180 microns | 11% | |
| 125–150 microns | 9% | |
| 90–125 microns | 10% | |
| <90 microns | 9%. | |
| Particle density | 1.17 g/ccm (NA Method A1a) | |
| Flowability: | 52 sec. (NA Method A23a). | |

We claim:

1. In a process for spray drying liquids containing dissolved or suspended solids to produce stable particle agglomerates, wherein the liquid is atomized in a drying chamber by means of an atomizer wheel to form droplets which are sprayed from said wheel along substantially outwardly directed paths; a stream of drying air encircling the atomizer wheel is conducted against the ejected droplets in directions predominantly axial with respect to said wheel and transversely to the paths of these droplets, whereby the droplets are dried to form a particulate material; recovering said particulate material; separating said recovered particulate material to recover at least a finest fraction thereof; and pneumatically recycling said finest fraction to the drying chamber upstream of said atomizer wheel to collide with ejected partly dried sticky particles, the improvement which comprises:
   (i) introducing said recycled finest particles fraction into the stream of drying air before it meets the ejected partly dried droplets;
   (ii) dispersing and entraining said finest dried particles fraction in a minor portion only of the stream of drying air;
   (iii) causing said entrained finest particles to transversely collide with the partly dried droplets at a predetermined distance from the wheel, and
   (iv) adjusting the location for the introduction of said finest particles to adjust said predetermined distance, of the place for collision, from the wheel as a function of the characteristics of the liquid being spray dried and the spray drying operational parameters, whereby to obtain agglomerates of a desired size and structure.

2. A spray drying apparatus comprising a drying chamber (3) having an atomizer wheel (5) therein for ejecting droplets of the liquid to be sprayed dried into the drying chamber, drying gas dispenser means (2) for providing a stream of drying gas around the atomizer wheel and predominantly transversely to the paths in which the droplets are ejected from the wheel, means to pass said drying gas containing spray dried particles entrained therein to a particle separator, a particle separator (11) for recovering at least the finest spray dried particles from the drying gas, and means for recycling these finest particles to the drying chamber, wherein said means for recycling the finest particles comprise at least one pipe (20) debouching in the drying chamber (3) at a location which, when the apparatus is in operation, is within the stream of drying gas, upstream of the area where said drying gas meets the ejected droplets, and so located that said finest particles are entrained within said drying gas and intersect the paths of said ejected droplets after said droplets are partially dried; and means for adjusting the location for the debouching of said at least one conduit whereby adjusting the distance between the place where the recycled finest particles entrained in drying gas collides with the ejected droplets and the atomizer wheel periphery.

3. A spray drying apparatus according to claim 2, wherein said atomizer wheel (5) is mounted in an atomizer housing of conical shape having its smallest diameter adjacent to the wheel, and wherein said drying gas disperser means is adapted to provide a stream of drying gas close to the outer walls (21) of said conical housing and in directions substantially parallel thereto, wherein said pipe (20) passes through said outer wall of said conical housing, and said pipe has an aperture (23) communicating with said drying chamber, and means for adjusting the normal distance (b) between said aperture and said conical outer wall of (21) of the housing.

4. A spray drying apparatus according to claim 3, wherein said pipe is telescopic and wherein said distance (b) from said aperture to said conical wall is adjustable by telescopic variation of the length of said pipe which projects into the drying chamber.

5. A spray drying apparatus according to claim 4, wherein said aperture (23) is placed in a peripheral position near the terminal end of a telescoped extension (22) of said pipe, wherein the length of said pipe is adjustable, by turning said extension whereby adjusting the distance (b) between the aperture and the conical housing wall (21).

6. A spray drying apparatus according to claim 2, wherein the location for the debouching of said at least one pipe is adjustable by means of a swivel joint (25) in a part of said pipe in the drying chamber.

7. A spray drying apparatus according to any one of claim 2-4 or 6, characterized in that said at least one pipe (20) is provided with a turntable deflector (26) guiding said finest particles to the periphery of said pipe before discharging them into the drying chamber, which deflector may be turned to pneumatically inject said finest particles in any direction substantially normal to the pipe.

8. A spray drying apparatus according to any one of the claims 2-6, characterized in having 4, 6, or 8 pipes located symmetrically in the same fixed distance from the atomizer axis.

9. A spray drying apparatus according to claim 7, characterized in having 4, 6 or 8 pipes located symmetrically in the same fixed distance from the atomizer axis.

* * * * *